United States Patent
Divakaran et al.

(10) Patent No.: US 6,847,680 B2
(45) Date of Patent: Jan. 25, 2005

(54) METHOD FOR DETECTING TALKING HEADS IN A COMPRESSED VIDEO

(75) Inventors: Ajay Divakaran, Denville, NJ (US); Regunathan Radhakrishnan, Ozone Park, NY (US)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 613 days.

(21) Appl. No.: 10/022,789

(22) Filed: Dec. 17, 2001

(65) Prior Publication Data

US 2003/0112865 A1 Jun. 19, 2003

(51) Int. Cl.$^7$ .......................... H04N 7/12; H04N 11/02
(52) U.S. Cl. ........................ 375/240.01; 375/240.08
(58) Field of Search ................. 375/240.01, 240.08; 382/159, 224, 118; 348/169; 725/38

(56) References Cited

U.S. PATENT DOCUMENTS

| | | | | |
|---|---|---|---|---|
| 5,280,530 A | * | 1/1994 | Trew et al. | 382/103 |
| 5,847,776 A | * | 12/1998 | Khmelnitsky et al. | 348/699 |
| 6,553,150 B1 | * | 4/2003 | Wee et al. | 382/243 |
| 2003/0007555 A1 | * | 1/2003 | Divakaran et al. | 375/240.01 |
| 2003/0095602 A1 | * | 5/2003 | Divakaran et al. | 375/240.16 |

OTHER PUBLICATIONS

Divakaran et al, 'A region based descriptor for spatial distibution of motion activity for compressed video', IEEE: Image Processing, 2000. Proceedings. 2000 International Conference on, vol:. 2, Sep. 10–13, 2000, pp.:287–290 vol. 2.*

Lorente et al, 'Face recognition of video sequences in a MPEG–7 context using a global eigen approach', IEEE: Image Processing, 1999. ICIP 99. Proceedings. 1999 International Conference on, vol.: 4, Oct. 24–28, 1999, pp.:187–191 vol. 4□□□□.*

* cited by examiner

*Primary Examiner*—Chris Kelley
*Assistant Examiner*—Erick Rekstad
(74) *Attorney, Agent, or Firm*—Dirk Brinkman; Andrew J. Curtin

(57) ABSTRACT

A method identifies a talking head or principal cast in a compressed video by first segmenting the video into shots. Motion activity descriptors are extracted from each of the shots, and combined into a shot motion activity descriptor. A distance between the shot motion activity descriptor and a template motion activity descriptor is measured. The template motion activity descriptor is obtained from a training video. If the measured distance is less than a predetermined threshold, then the shot is identified as including a talking head.

16 Claims, 3 Drawing Sheets

METHOD FOR DETECTING TALKING HEADS IN A COMPRESSED VIDEO

FIELD OF THE INVENTION

The present invention relates generally to extracting motion activity from a compressed video, and more particularly, to identifying talking heads or principal cast in a compressed video.

BACKGROUND OF THE INVENTION

Compressed Video Formats

Basic standards for compressing the bandwidth of digital color video signals have been adopted by the Motion Picture Experts Group (MPEG). The MPEG standards achieve high data compression rates by developing information for a full frame of the image only every so often. The full image frames, i.e. intra-coded frames, are often referred to as "I-frames" or "anchor frames," and contain full frame information independent of any other frames. Image difference frames, i.e. inter-coded frames, are often referred to as "B-frames" and "P-frames," or as "predictive frames," and are encoded between the I-frames and reflect only image differences i.e. residues, with respect to the reference frame.

Typically, each frame of a video sequence is partitioned into smaller blocks of picture element, i.e. pixel, data. Each block is subjected to a discrete cosine transformation (DCT) function to convert the statistically dependent spatial domain pixels into independent frequency domain DCT coefficients. Respective 8×8 or 16×16 blocks of pixels, referred to as "macro-blocks," are subjected to the DCT function to provide the coded signal.

The DCT coefficients are usually energy concentrated so that only a few of the coefficients in a macro-block contain the main part of the picture information. For example, if a macro-block contains an edge boundary of an object, the energy in that block after transformation, i.e., as represented by the DCT coefficients, includes a relatively large DC coefficient and randomly distributed AC coefficients throughout the matrix of coefficients.

A non-edge macro-block, on the other hand, is usually characterized by a similarly large DC coefficient and a few adjacent AC coefficients which are substantially larger than other coefficients associated with that block. The DCT coefficients are typically subjected to adaptive quantization, and then are run-length and variable-length encoded for the transmission medium. Thus, the macro-blocks of transmitted data typically include fewer than an 8×8 matrix of codewords.

The macro-blocks of inter-coded frame data, i.e. encoded P or B frame data, include DCT coefficients which represent only the differences between a predicted pixels and the actual pixels in the macro-block. Macro-blocks of intra-coded and inter-coded frame data also include information such as the level of quantization employed, a macro-block address or location indicator, and a macro-block type. The latter information is often referred to as "header" or "overhead" information.

Each P frame is predicted from the lastmost occurring I or P frame. Each B frame is predicted from an I or P frame between which it is disposed. The predictive coding process involves generating displacement vectors, often referred to as "motion vectors," which indicate the magnitude of the displacement to the macro-block of an I frame most closely matches the macro-block of the B or P frame currently being coded. The pixel data of the matched block in the I frame is subtracted, on a pixel-by-pixel basis, from the block of the P or B frame being encoded, to develop the residues. The transformed residues and the vectors form part of the encoded data for the P and B frames.

Older video standards, such as ISO MPEG-1 and MPEG-2, are relatively low-level specifications primarily dealing with temporal and spatial compression of video signals. With these standards, one can achieve high compression ratios over a wide range of applications. Newer video coding standards, such as MPEG-4, see "Information Technology—Generic coding of audio/visual objects," ISO/IEC FDIS 14496-2 (MPEG4 Visual), November 1998, allow arbitrary-shaped objects to be encoded and decoded as separate video object planes (VOP). These emerging standards are intended to enable multimedia applications, such as interactive video, where natural and synthetic materials are integrated, and where access is universal. For example, one might want to extract features from a particular type of video object, or to perform for a particular class of video objects.

With the advent of new digital video services, such as video distribution on the INTERNET, there is an increasing need for signal processing techniques for identifying information in video sequences, either at the frame or object level, for example, identification of activity.

Feature Extraction

Previous work in feature extraction for identification and indexing from compressed video has primarily emphasized DC coefficient extraction. In a paper entitled "Rapid Scene Analysis on Compressed Video," IEEE Transactions on Circuits and Systems for Video Technology, Vol. 5, No. 6, December 1995, page 533–544, Yeo and Liu describe an approach to scene change detection in the MPEG-2 compressed video domain. The authors also review earlier efforts at detecting scene changes based on sequences of entire uncompressed image data, and various compressed video processing techniques of others. Yeo and Liu introduced the use of spatially reduced versions of the original images, so-called DC images, and DC sequences extracted from compressed video to facilitate scene analysis operations. Their "DC image" is made up of pixels which are the average value of the pixels in a block of the original image and the DC sequence is the combination of the reduced number of pixels of the DC image. It should be noted that the DC image extraction based technique is good for I-frames since the extraction of the DC values from I-frames is relatively simple. However, for other type frames, additional computation is needed.

Won et al, in a paper published in Proc. SPIE Conf. on Storage and Retrieval for Image and Video Databases, January 1998, describe a method of extracting features from compressed MPEG-2 video by making use of the bits expended on the DC coefficients to locate edges in the frames. However, their work is limited to I-frames only. Kobla et al describe a method in the same Proceedings using the DC image extraction of Yeo et al to form video trails that characterize the video clips.

Feng et al. (IEEE International Conference on Image Processing, Vol. 11, pp. 821–824, Sep. 16–19, 1996), use the bit allocation across the macro-blocks of MPEG-2 frames to detect shot boundries, without extracting DC images. Feng et al.'s technique is computationally the simplest since it does not require significant computation beyond that required for parsing the compressed bit-stream.

U.S. patent applications entitled "Methods of scene change detection and fade detection for indexing of video sequences," (application Ser. No. 09/231,698, filed Jan. 14, 1999), "Methods of scene fade detection for indexing of video sequences," (application Ser. No. 09/231,699, filed Jan. 14, 1999), "Methods of Feature Extraction for Video Sequences," (application Ser. No. 09/236,838, Jan. 25, 1999), describe computationally simple techniques which build on certain aspects of Feng et al.'s approach and Yeo et al's approach to give accurate and simple scene change detection.

After a suspected scene or object change has been accurately located in a group of consecutive frames by use of a DC image extraction based technique, application of an appropriate bit allocation-based technique and/or an appropriate DC residual coefficient processing technique to P or B-frame information in the vicinity of the located scene quickly and accurately locates the cut point. This combined method is applicable to either MPEG-2 frame sequences or MPEG-4 multiple object sequences. In the MPEG-4 case, it is advantageous to use a weighted sum of the change in each object of the frame, using the area of each object as the weighting factor. Locating scene changes is useful for segmenting a video into shots.

U.S. patent application Ser. No. 09/345,452 entitled "Compressed Bit-Stream Segment Identification and Descriptor," filed by Divakaran et al. on Jul. 1, 1999 describes a technique where magnitudes of displacements of inter-coded frames are determined based on the number bits in the compressed bit-stream associated with the inter-coded frames. The inter-coded frame includes macro-blocks. Each macro-block is associated with a respective portion of the inter-coded frame bits which represent the displacement from that macro-block to the closest matching intra-coded frame. The displacement magnitude is an average of the displacement magnitudes of all the macro-blocks associated with the inter-coded frame. The displacement magnitudes of those macro-blocks which are less than the average displacement magnitude are set to zero. The number of run-lengths of zero magnitude displacement macro-blocks is determined to identify the first inter-coded frame.

Motion Activity

Prior art motion activity work has mainly focused on extracting motion activity and using the motion activity for low level applications such as detecting scene or shot changes, see U.S. patent application Ser. No. 09/236,838 "Methods of Feature Extraction of Video," filed by Divakaran et al. on Jan. 25, 1999, incorporated herein by reference.

Motion activity can also be used to gauge the general motion activity and the spatial distribution of motion activity in video shots. Such descriptors have been successful in video browsing applications by filtering out all the high action shots from low actions shots, see U.S. Pat. No. 5,552,832 "Run-length encoding sequence for video signals," issued to Astle on Sep. 3, 1996. The strength of such descriptors lies in their computational simplicity.

It is desired to rapidly identify segments or shots of a video that include talking heads, and those shots that do not. Using motion activity, in the compressed domain, could speed up segmenting and indexing of reduced size videos for more sophisticated detection of talking heads, see for example, Y. Wang, Z Liu and J-C. Huang, "Multimedia Content Analysis," IEEE Signal Processing Magazine, November 2000. Prior art talking head detection has been mainly focused on detecting colors, e.g., flesh, or detecting faces, which requires complex operations.

SUMMARY OF THE INVENTION

The invention provides a method for identifying frames in a compressed video that include "principal cast" or other "talking heads." Then, the video can be rapidly segmented, and computationally more expensive face detection and recognition processes can be employed on just the frames of the reduced size video.

The invention uses a template obtained from the centroid of a ground truth set of features, alternatively, multiple clustered templates can also be used. The feature vectors of the templates can be modeled using a Gaussian mixture model (GMM) applied to training data.

More particularly, the invention provides a method for identifying a talking head or principal cast in a compressed video. The video is first segmented into shots. Then, motion activity descriptors are extracted from each of the shots, and combined into a shot motion activity descriptor. A distance between the shot motion activity descriptor and a template motion activity descriptor is measured. The template motion activity descriptor is obtained from a training video. If the measured distance is less than a predetermined threshold, then the shot is identified as including a talking head.

DETAILED DESCRIPTION OF THE PREFERRED EMBODIMENT

Motion Activity Descriptor

Figure 1:
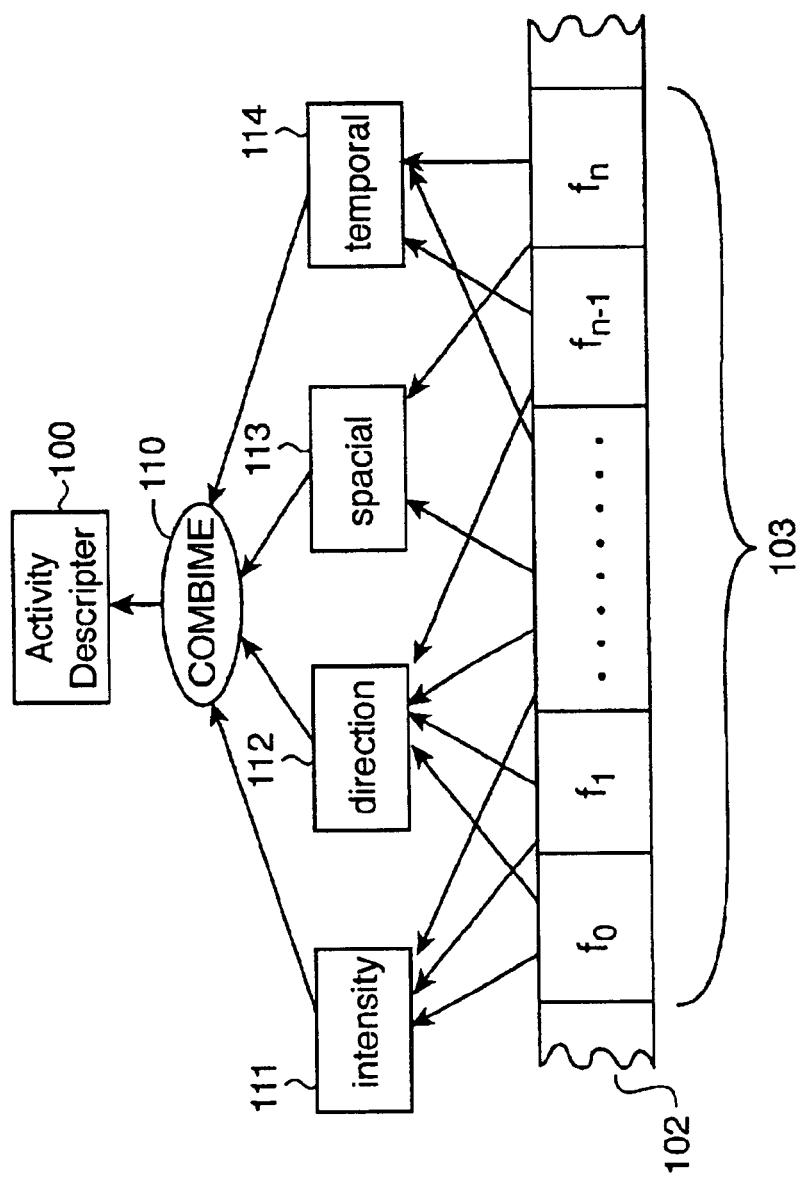
FIG. 1 is a block diagram of an activity descriptor according to the invention.

FIG. 1 shows an activity descriptor 100 that is used to detect talking heads in a compressed video 102, according to the invention. The video 102 includes sequences of frames $(f_0, \ldots, f_n)$ that form "shots" 103. Hereinafter, a shot, scene, or a segment of the video 102 means a set of frames that have some temporal cohesiveness, for example, all frames taken between a lens opening and closing. The invention analyzes uses spatial, temporal, directional, and intensity information in the video 102.

The spatial information expresses the size and number of moving regions in the shot on a frame by frame basis. The spatial information distinguishes between "sparse" shots with a small number of large moving regions, for example, a "talking head," and a "dense" shot with many small moving regions, for example, a football game. Therefore, a sparse level of activity shot is said to have a small number of large moving regions, and a dense level of activity shot is said to have a large number of small moving regions.

The distribution of the temporal information expresses the duration of each level of activity in the shot. The temporal information is an extension of the intensity of motion activity in a temporal dimension. The direction information expresses the dominant direction of the motion in a set of eight equally spaced directions. The direction information can be extracted from the average angle (direction) of the motion vectors in the video.

Therefore, the activity descriptor 100 combines 110 intensity 111, direction 112, spatial 113, and temporal 114 attributes of the level of activity in the video sequence 102.

Motion Vector Magnitude

The parameters for motion activity descriptor 100 are derived from the magnitude of video motion vectors as follows. For object or frame an "activity matrix" $C_{mv}$ is defined as:

$$C_{mv} = \{B(i,j)\}$$

where, $$(B(i,j)) = \sqrt{x_{i,j}^2 + y_{i,j}^2}$$

where $(x_{i,j}, y_{i,j})$ is the motion vector associated with the (i,j)th block B. For the purpose of extracting the activity descriptor 100 in an MPEG video, the descriptor for a frame or object is constructed according to the following steps.

Motion Activity Descriptor Extraction

Figure 2:
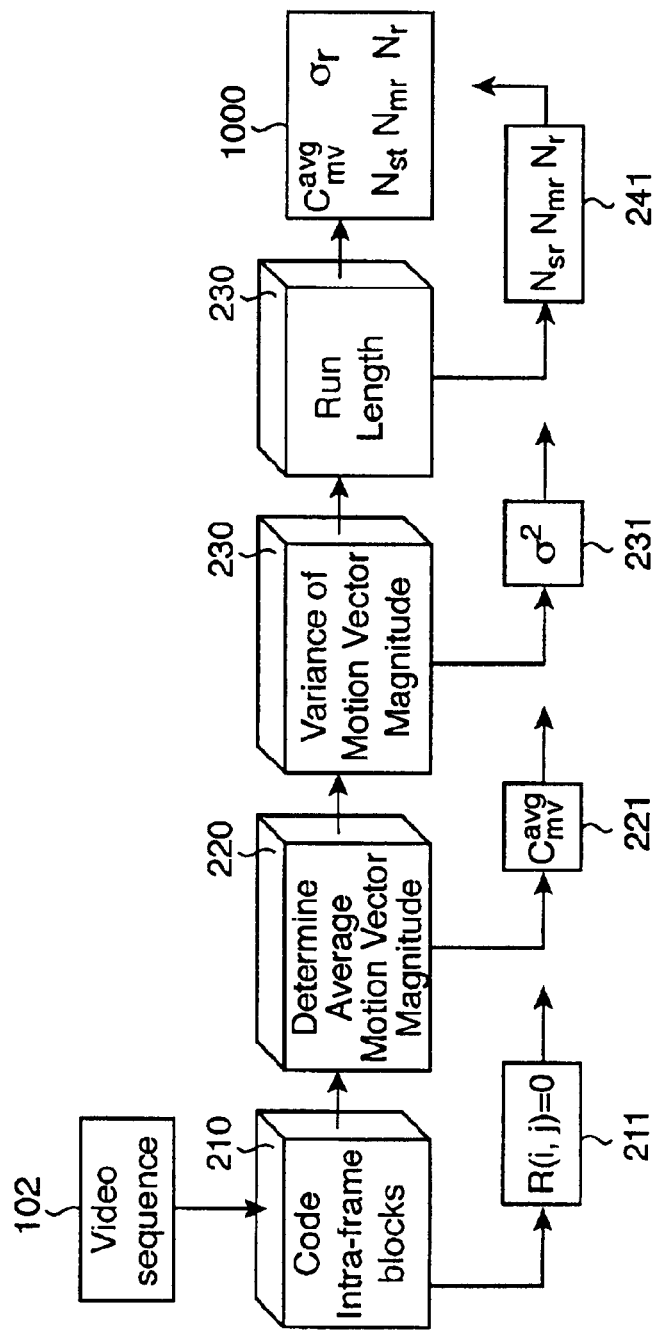
FIG. 2 is a flow diagram of a method for extracting the activity descriptor from the magnitudes of motion vectors of a frame.

FIG. 2 shows a method 200 for extracting activity attributes 100. In step 210, intra-coded blocks, B(i,j) 211 are set to zero. Step 220 determines the average motion vector magnitude $C_{mv}^{avg}$ 221, or "average motion complexity," for each block B of the frame/object as:

$$C_{mv}^{avg} = \frac{1}{MN} \sum_{i=0}^{M} \sum_{j=0}^{N} C_{mv}(i, j)$$

M=width in blocks
N=height in blocks
Step 230 determines the variance $\sigma^2$ 231 of $C_{mv}^{avg}$ as:

$$\sigma_{fr}^2 = \frac{1}{MN} \sum_{i=0}^{M} \sum_{j=0}^{N} (C_{mv}(i,j) - C_{mv}^{avg})^2$$

M=width in blocks
N=height in blocks
Step 240 determines the "run-length" parameters 241 of the motion vector activity matrix $C_{mv}$ by using the average as a threshold on the activity matrix as:

$$C_{mv}^{thresh}(i, j) = \begin{cases} C_{mv}(i, j), & \text{if } C_{mv}(i, j) \geq C_{mv}^{avg} \\ 0, & \text{otherwise.} \end{cases}$$

For the purpose of the following description, the zero run-length parameters, in terms of a raster-scan length, are of particular interest.

We classify zero run-length parameters into three categories: short, medium and long. The zero run-length parameters are normalized with respect to the object/frame width. Short zero run-lengths are defined to be ⅓ of the frame width or less, medium zero run-lengths are greater than ⅓ of the frame width and less than ⅔ of the frame width. Long zero run-lengths are equal to or greater than the width of the frame, i.e., the run-length extends over several raster-scan lines in a row. For a further description of "zero run-lengths" see U.S. patent application Ser. No. 09/236,838 "Methods of Feature Extraction of Video," filed by Divakaran et al. on Jan. 25, 1999, incorporated herein by reference.

In the notation below, we use the parameter $N_{sr}$ as the number of short zero run-lengths, and medium zero run-lengths, and long zero run-lengths are similarly defined with the parameters $N_{mr}$ and $N_{lr}$, respectively. The zero run-length parameters are quantitized to obtain some invariance with respect to rotation, translation, reflection, and the like.

Therefore, the motion activity descriptor 100 for the frame/object include:

$$C_{mv}^{avg}, N_{sr}, N_{mr}, N_{lr}, \sigma_{fr},$$

where $\sigma$ is the standard deviation.

Talking Head Identification Method

Figure 3:
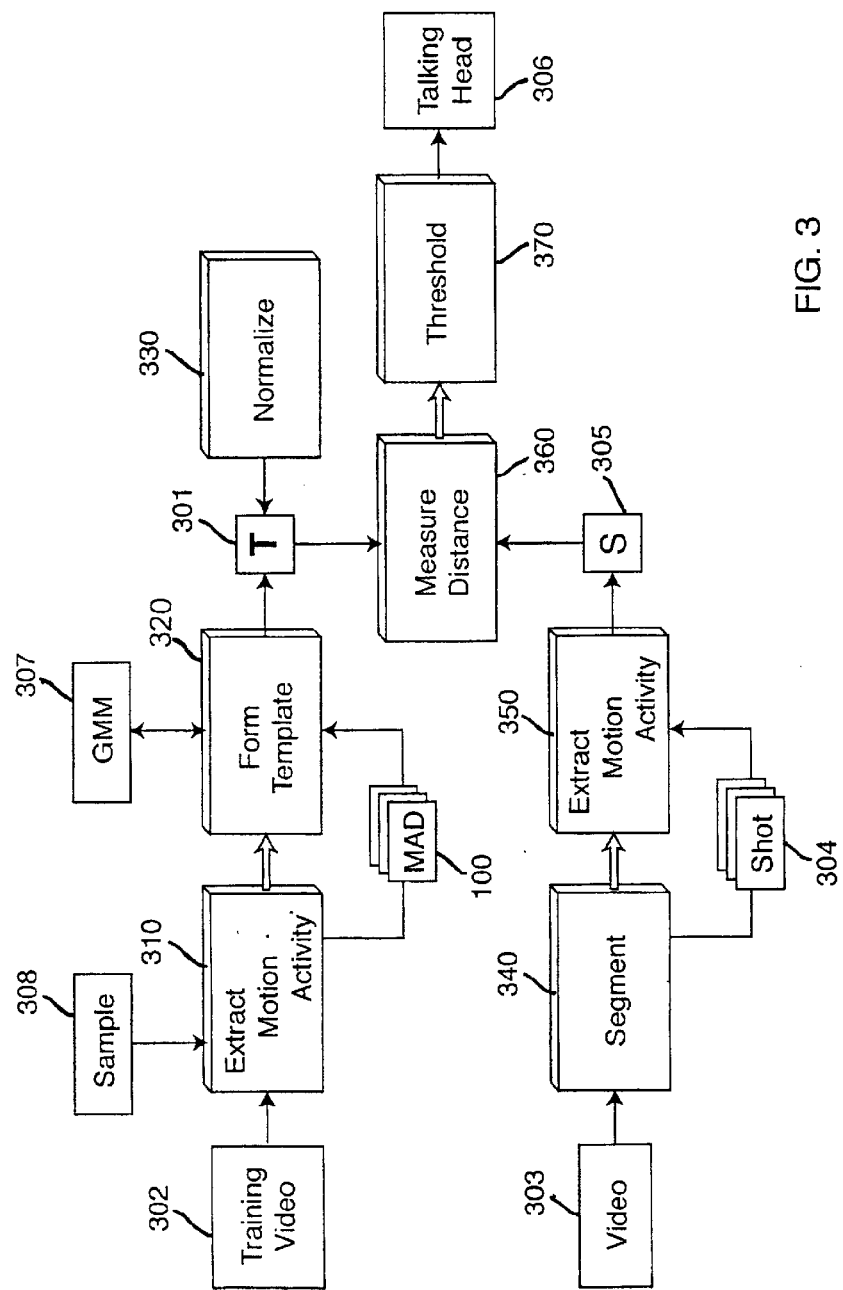
FIG. 3 is a flow diagram of a method for identifying talking heads in a compressed video according to the invention.

As shown in FIG. 3, we use the MPEG-7 motion activity descriptor 100, as described above, to identify "talking heads" or "principal cast" member in a compressed video. Finding the talking head, or more narrowly, the "news-anchor shots," enables video summarization by establishing beginnings and endings of news-stories, for example.

First, in a set of one time only preprocessing steps, a template motion activity descriptor (T) 301 is formed. The template can be constructed semi-automatically, or automatically from representative "training" talking head shots. The latter is done by extracting 310 motion activity descriptors (MAD) 100 from a training video 302. The training video can include a large number of shots, for example, ten to hundreds of typical talking head shots. The training video can include shots, from American, Mexican, Japanese, Chinese, and other news programs showing the portions of the programs that just include the anchor person or talking head. The motion activity descriptors 100 are combined 320 to form the template motion activity descriptor (T) 301. The combining 320 can be centroid or average of the motion activity descriptors 100. As an optional step, a weighted or normalized (W) 330 factor can be produced according to:

$$W_{tot} = C_{avg}(T) + N_{sr}(T) + N_{mr}(T) + N_{lr}(T)$$

After the template 301 is formed, talking head shots in a video 303 are identified as follows. First, the video 303 can be segmented 340 into shots 304 using any known segmentation process. If the segmentation is based on compressed DC images, then the shot segmentation and the shot identification can be done in a single pass.

Then, motion activity descriptors are extracted 350 from each shot 304. The motion activity descriptors are combined into a single shot (S) descriptor 305, as described for the template 301 above. Then, for each shot 304, a distance D(S,T) is measured 360 according to:

$$D(S, T) = \frac{W_{tot}}{C_{avg}(T)}|C_{avg}(T) - C_{avg}(S)| + \frac{W_{tot}}{N_{sr}(T)}|N_{sr}(T) - N_{sr}(S)| +$$

$$\frac{W_{tot}}{N_{mr}(T)}|N_{mr}(T) - N_{mr}(S)| + \frac{W_{tot}}{N_{lr}(T)}|N_{lr}(T) - N_{lr}(S)|$$

where T is the template motion activity descriptor 301, and S is the shot motion activity descriptor 305 of the shot which is being tested for a talking head identification.

We then apply thresholding 370 on the distance, using, for example, the standard deviation $\sigma$ of the template motion activity descriptor, as described above. If the measured distance is within the standard deviation, then the shot is identified as a talking head shot 306. Shots identified as talking head shots can be retained for further processing or indexing, and all other shots can be discarded.

We can take into consideration the fact that talking head shots are homogenous. In this case, after identifying a shot as a talking head shot, as per the distance from one of the templates, we can check its homogeneity as a double check. We check its homogeneity by determining the difference between the mean of the motion activity descriptors and the median of the motion activity descriptors. If the difference exceeds a certain determined threshold, we declare that it is not a talking head. We get some improvement in the results with this additional test compared to using the distance from the template(s) alone.

The basic motion-based talking head identification method according to the invention is computationally simple and elegant, in contrast with prior art color or structure based methods. However, the number of false alarms does not fall as one reduces the size of the shots, as it should. This is probably be due to the fact that the motion activity descriptors are averaged over the shot, and the single template 301 is unable to correctly capture the temporal variation of talking head features for an entire shot. There, the method of the invention can also use multiple templates. In this case, the template T 301 becomes a set of templates, and the distance is measured between the shot motion activity descriptor, and the descriptors of the set of templates. In this case the thresholding can be based on minimum or maximum distance values.

Gaussian Mixtures

The template or set of templates 301 are formed using discrete functions, e.g., a vector of four elements. However, the low dimension vectors of the templates can also be formed, during the one time preprocessing, using continuous functions, for example, a probability density. In this case, a Gaussian mixture model (GMM) 307 that best fits the training video 302 is first trained. As an advantage, the GMM forms smooth approximations to arbitrarily shaped densities, and captures "fuzzy" or probabilistic features of the training video 302.

We can then use well known maximum likelihood (ML) estimation to update the model parameters, i.e., the mean, variance and mixture weight, which maximize the likelihood of the GMM, given the training video 302. Depending on the number of templates desired for the identification method, we can select the means of component Gaussians as the set of templates 301, in a decreasing order of mixture weights.

Distance Metrics

It is also possible to measure the semi-Hausdorff distance ($d_{sh}$) between the templates and motion activity descriptor of each frame of a particular shot. The semi-Hausdorff distance $d_{sh}$ between the motion activity descriptor of a particular template T 301 and a set of frames in a particular video shot 304 is defined as follows.

A set of templates 301, includes m elements $T_i, i=1, \ldots, m$, and a shot S to be tested for a "talking head" containing n frames $S_i, i=1, \ldots, n$. A distance between a template $T_i$ and a particular frame $S_i$ is $d(T_i, S_i)$, as defined above.

The distance $d_i$ for each of the frames $T_i$, is $d_i = \min(d(T_k, T_R))$, for $k=0, \ldots, m$, and then the semi-Hausdorff distance between T and S is $d_{sh}(T, S) = \max(d_i)$, for $i=1, \ldots, n$.

In other words, first, for all i, we measure the distance $d_i$ between each frame $S_i$ and its best representative in the template set T 301. Next, we determine the maximum of the distances $d_i$, as above. Thus, we determine how "close" the shot 304 is to the template set T 301. If the representation is better, then the semi-Hausdorff distance between the frames S and the templates T is lower. For example, if a shot has a low semi-Hausdorff distance, then this indicates homogeneity of the shot with respect to the chosen template set.

The performance of the method according to the invention is better when multiple templates are used instead of just a single template. However, this is improvement comes with additional increase in complexity of finding the semi-Hausdorff distance between the template set and the frames of the shot. The complexity can be simplified by sampling 308 the shot and using the sampled subset of frames in the shot to derive the distances, without substantially reducing the performance of the method.

This invention is described using specific terms and examples. It is to be understood that various other adaptations and modifications may be made within the spirit and scope of the invention. Therefore, it is the object of the appended claims to cover all such variations and modifications as come within the true spirit and scope of the invention.

We claim:

1. A method for identifying talking heads in a compressed video, comprising:

extracting motion activity descriptors from each of a plurality of shots;

combining the plurality of motion activity descriptors of each shot, into a shot motion activity descriptor;

measuring a distance between the shot motion activity descriptor and a template motion activity descriptor; and identifying a particular shot as a talking head if the measured distance is less than a predetermined threshold.

2. The method of claim 1 further comprising:

extracting a plurality of training motion activity descriptors from a training video including a plurality of training shots, each training shot including a training talking head; and combining the plurality of training motion activity descriptors into the template motion activity descriptor.

3. The method of claim 2 wherein the combining is a median of the plurality of training motion activity descriptors.

4. The method of claim 2 wherein the combining is a mean of the plurality of training motion activity descriptors.

5. The method of claim 1 further comprising:

normalizing the measured distance.

6. The method of claim 1 wherein the threshold is a standard deviation σ of the temple motion activity descriptor.

7. The method of claim 1 wherein each motion activity descriptor is of the form $C_{mv}^{avg}, N_{sr}, N_{mr}, N_{lr}, \sigma_{fr}$, where $C_{mv}^{avg}$ is an average motion vector, and $N_{sr}, N_{mr}, N_{lr}$ are short, medium and long run zero-length motion vectors, respectively.

8. The method of claim 7 wherein the distance is measured according to:

$$D(S, T) = \frac{W_{tot}}{C_{avg}(T)}|C_{avg}(T) - C_{avg}(S)| + \frac{W_{tot}}{N_{sr}(T)}|N_{sr}(T) - N_{sr}(S)| + \frac{W_{tot}}{N_{mr}(T)}|N_{mr}(T) - N_{mr}(S)| + \frac{W_{tot}}{N_{lr}(T)}|N_{lr}(T) - N_{lr}(S)|$$

where $W_{tot}$ is a normalizing weight, T is the template motion activity descriptor, and S is the shot motion activity descriptor.

9. The method of claim 1 further comprising:

measuring a distance between the shot motion activity descriptor and a set of template motion activity descriptors.

10. The method of claim 1 wherein the distance is a semi-Hausdorff distance.

11. The method of claim 1 wherein the template motion activity is modeled by a discrete function.

12. The method of claim 1 wherein the template motion activity is modeled by a continuous function.

13. The method of claim 12 wherein the continuous function is a mixture of Gaussian distributions.

14. The method of claim 1 further comprising:

extracting a plurality of training motion activity descriptors from sampled frames of a training video including a plurality of training shots, each training shot including a training talking head; and combining the plurality of training motion activity descriptors into the template motion activity descriptor.

15. The method of claim 1 further comprising:

segmenting the video into the plurality of shots using the motion activity descriptors.

16. The method of claim 1 further comprising:

retaining only talking head shots.

* * * * *